Figure 1:
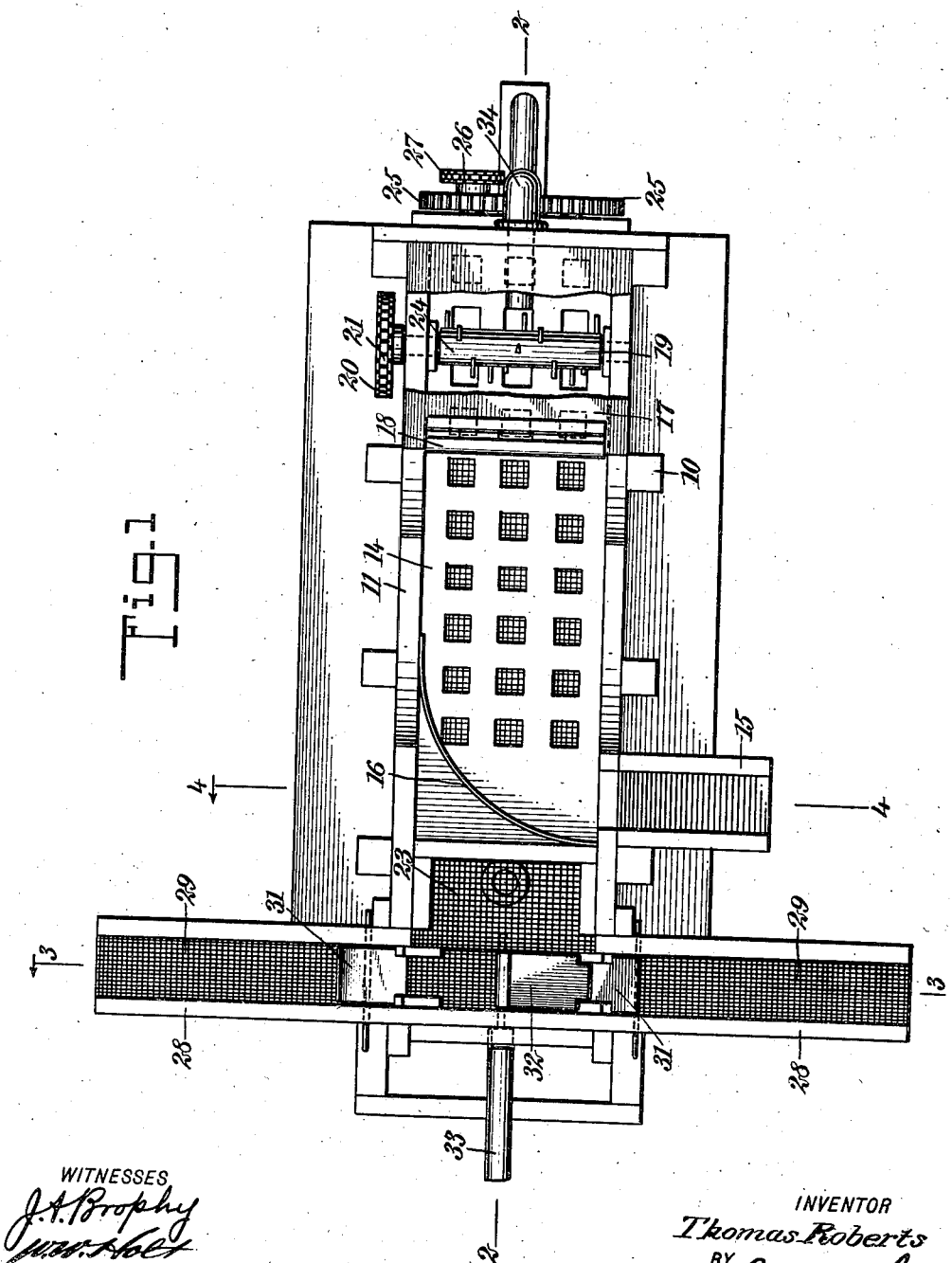

T. ROBERTS.
WASHER FOR PEBBLE PHOSPHATE AND THE LIKE.
APPLICATION FILED APR. 18, 1908.

997,854.

Patented July 11, 1911.
3 SHEETS—SHEET 1.

WITNESSES

INVENTOR
Thomas Roberts
BY
ATTORNEYS

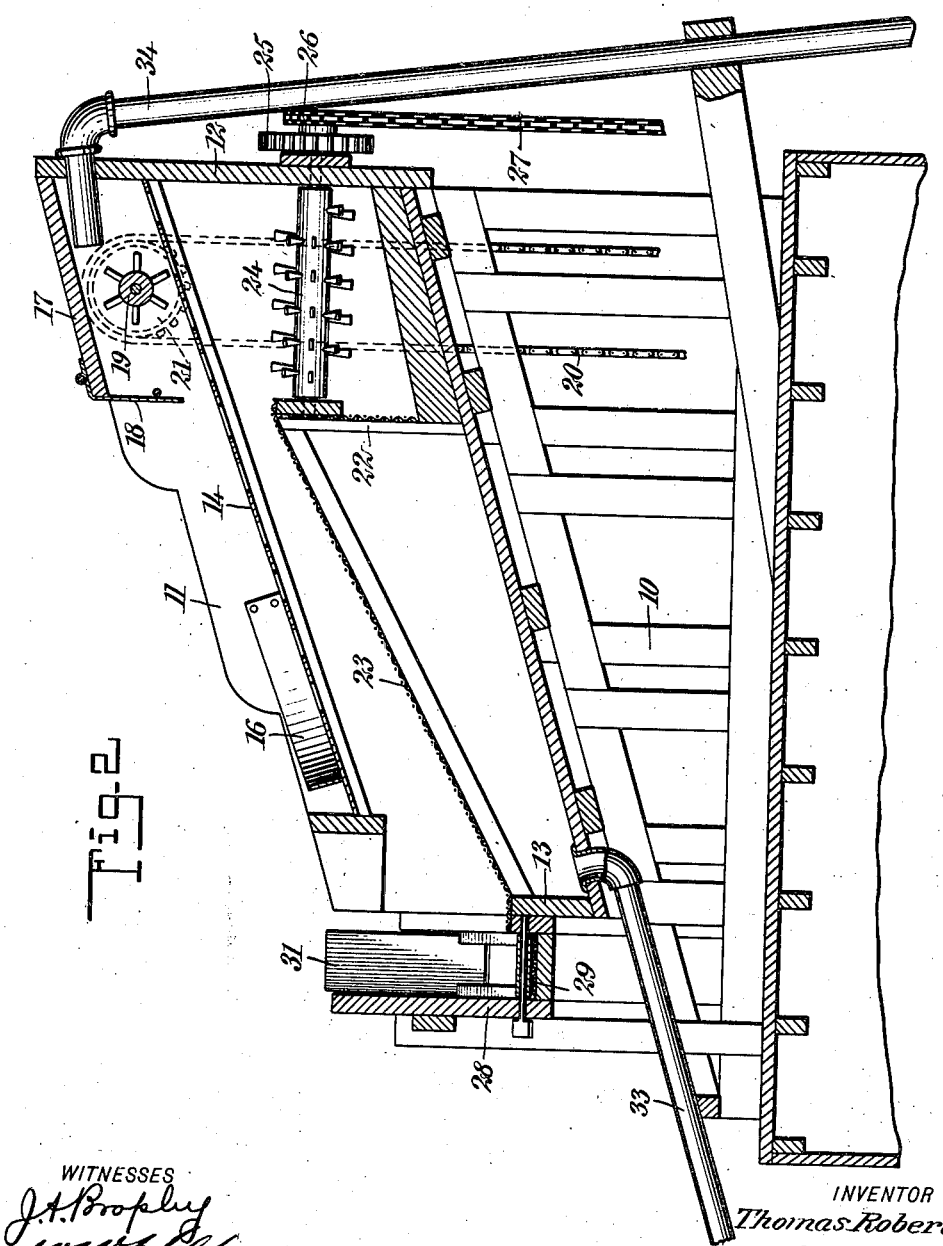

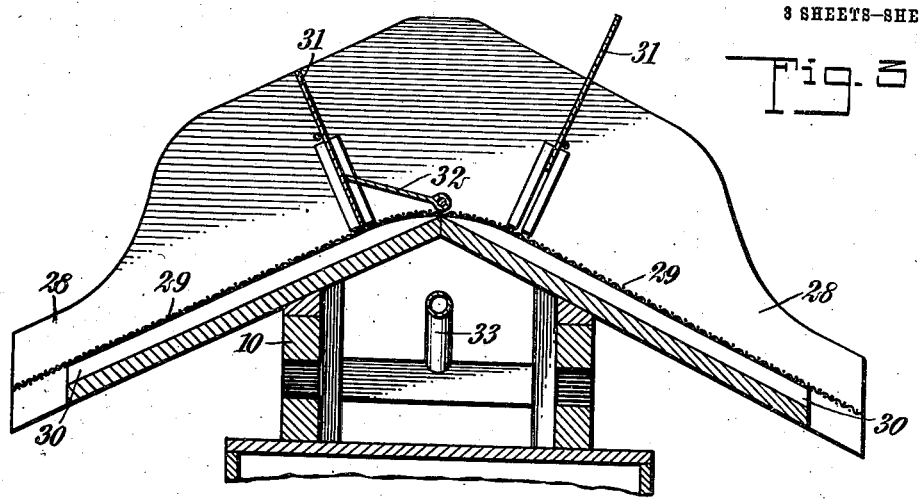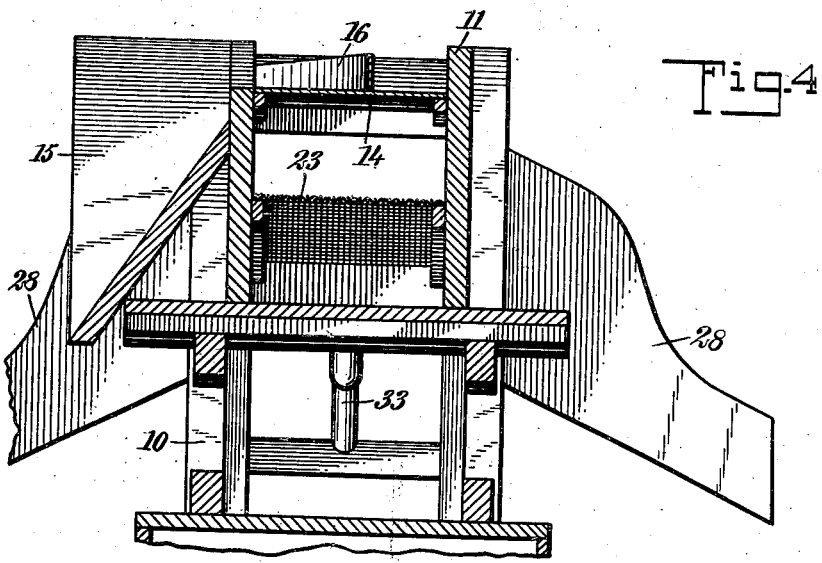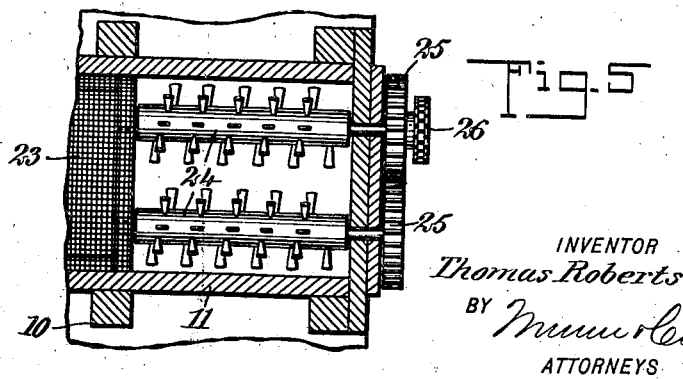

UNITED STATES PATENT OFFICE.

THOMAS ROBERTS, OF CHARLOTTE HARBOR, FLORIDA.

WASHER FOR PEBBLE-PHOSPHATE AND THE LIKE.

997,854.

Specification of Letters Patent. Patented July 11, 1911.

Application filed April 18, 1908. Serial No. 427,798.

*To all whom it may concern:*

Be it known that I, THOMAS ROBERTS, a citizen of the United States, and a resident of Charlotte Harbor, in the county of De Soto and State of Florida, have invented a new and Improved Washer for Pebble-Phosphate and the Like, of which the following is a full, clear, and exact description.

This invention is an improved apparatus or washer for the separation of pebble phosphate from sand, roots, etc. with which it is mixed, as generally obtained from the deposit at the bottom of water.

The washers as at present used in this industry consist essentially of a single screen on which the pebbles, together with sand, roots, etc., are directly discharged. This has been found generally unsatisfactory for the reason that it is necessary to remove the roots by hand, and a large part of the sand is unseparated from the pebbles by the screen owing to the large volume of water, thus making it necessary to again wash the pebbles, usually by the use of hydraulic pumps, before the pebbles are ready to go to the roaster.

My apparatus is designed to automatically remove and discharge the roots and rid the pebbles of substantially all the sand, which it does by first cutting up the roots in order to facilitate their expulsion over a grating. This grating admits of the passage of the sand and pebbles through it to conveyers operating in a screened pocket adjacent to the screen on which they discharge. The screen in turn discharges on a second screen leading to the receiver for the pebbles, which is usually a barge.

Reference is to be had to the accompanying drawings forming a part of this specification, in which similar characters of reference indicate corresponding parts in all the views.

Figure 1 is a plan of the preferred form of my improved washer; Fig. 2 is a longitudinal central section of the same on the line 2—2 of Fig. 1; Fig. 3 is a cross-section on the line 3—3 of Fig. 1, on an enlarged scale, and looking in the direction of the arrow; Fig. 4 is a like section on the line 4—4 of Fig. 1; and Fig. 5 is a fragmentary horizontal section just above the conveyers.

The washer is designed to be located on the upper deck of the dredge, from which it is supported by a suitable framework 10. On this framework is mounted a downwardly-inclined trough or raceway 11, having its upper end closed by a wall 12, and its lower end likewise closed for about one-third its height by a wall 13. Arranged within the raceway near its top, approximately conforming to the inclination of its bottom, is a grating 14 discharging into a chute 15 at its lower end, which projects from one side of the trough, the discharge from the grating into the chute being facilitated by providing a curved wall 16 in its opposite lower corner. Arranged over the grating at its upper portion is a cover 17, as best shown in Fig. 2, provided with a depending guard 18 hinged thereto adjacent to its forward edge. Directly under the cover 17 and above the grating is journaled in the opposite walls of the raceway, a cutter 19 having radially-projecting knives, and driven from the engine shaft in any suitable manner by a chain 20 passing over a sprocket wheel 21, the latter being fixed directly to the cutter at the outside of the raceway.

Spaced from the end wall 12 and within the raceway is an upright open frame 22, forming in connection with said wall a pocket, and covered by a screen 23 which is extended over its upper end to the end wall 13, this screen being of greater inclination than the bottom of the raceway and grating 14. Within the pocket formed by the end wall 12 and frame 22 are journaled at its top, longitudinally-arranged conveyers 24, each having teeth spirally arranged and extended to the outside of the end wall 12 where they are directly intergeared together by gears 25, one of said gears having a sprocket wheel 26 in fixed relation thereto, which is suitably driven from the engine shaft by a chain 27.

At the terminus of the screen 23 are downwardly-inclined chutes 28, arranged transversely of the raceway, and each provided with a screen 29 slightly elevated above its bottom, the latter, as best shown in Fig. 3, terminating a short distance from the end of the sides of the chute, providing discharge openings 30. Above each screen 29, at the opposite sides of the screen 23, the chutes 28 are provided with gates 31, each being arranged at approximately right-angles to the bottom of its respective chute in order that it will remain in an open position when withdrawn, by the frictional contact with its guides. Centrally between the gates is hinged a leaf 32, adapted to be swung from side to side and form a continuation of either of the screens 29, and obviously operating to direct the flow to that screen which it is not covering, and preventing the passage of the material over and through the opposite screen.

The bottom of the raceway discharges at its lower end through a discharge or sand pipe 33, ordinarily leading overboard, and the pebble phosphate mixed in with the roots, sand, etc., as it is pumped from the deposit, is led in through the end wall 12 of the raceway in front and at the top of the cutter 19, by a pipe 34. The action of this cutter is to chop up the roots and thereby facilitate their discharge by the water down the inclined grating 14 through the chute 15. The guard 18 prevents the shooting of the material from the pipe 34 beyond the cover 17, but will not operate to choke the flow over the grating, by reason of its hinged connection. During this travel of the roots, the sand and pebbles separate out, the largest portion falling into the pocket over the conveyers 24, and a lesser quantity falling directly on the screen 23. A portion of the sand contained in the pebbles falling in the pocket, washes out through that portion of the screen over the open framework, and the pebbles, with what sand remains, are forced by the conveyers over the screen 23, from which they pass to a screen 29 in one of the chutes 28, depending of course on the gate open and the position of the leaf 32. The chute 28, through which the material is discharged, usually leads to the edge of a barge alongside the dredge, and since these chutes are arranged at both sides of the washer, the loading may take place from either side. During the travel of the pebbles down the screen 29, what sand remains mixed with them passes, together with the remaining water, to the bottom of the trough and out through the opening 30, overboard. The major portion of the sand, however, will pass through the screen 23 and will be discharged from the bottom of the raceway through the pipe 33.

Having thus described my invention, I claim as new and desire to secure by Letters Patent:

1. In a washer for pebble phosphate containing roots, sand, etc., a grating on which the phosphate, pebbles, roots and sand are discharged, a rotary member to facilitate the discharge of the roots over the grating, and independent means for separating the sand and discharging the pebbles in an approximately free state.

2. In a washer for pebble phosphate or the like containing roots, sand, etc., means for cutting the roots and separating them from the pebbles and sand, screening means for separating the pebbles from the major portion of the sand, and re-screening means for separating the pebbles from the remaining part of the sand and discharging the pebbles in an approximately free state.

3. The combination of an inclined raceway, an inclined grating arranged near the top of the raceway and provided with a discharge chute, a revoluble cutter arranged over the grating near the upper end of the chute, chutes arranged transversely of the raceway adjacent to the lower end thereof, and an inclined screen arranged under the grating in the raceway and discharging into either of said chutes.

4. The combination of an inclined raceway, chutes arranged transversely of the raceway adjacent to the lower end thereof having screens elevated above their bottoms, a screen carried by the raceway discharging on either of the screens carried by the chute, and means controllable at will to direct the discharge from the raceway screen to either of the chute screens.

5. The combination of an inclined raceway, an inclined grating arranged near the top of the raceway, a revoluble cutter within the raceway adjacent to its upper end and arranged over the grating, an open frame forming in connection with the upper end of the raceway a pocket, an inclined screen arranged under the grating and extended to cover said frame, and a conveyer arranged at the top of said pocket and discharging on said screen.

6. The combination of an inclined raceway, an inclined grating arranged in the raceway near the upper portion thereof, a revoluble cutter arranged over the grating adjacent to the upper end of the raceway, and a cover over the cutter having a depending hinged guard and means for delivering a watery mixture of phosphate pebbles, sand, etc., to the raceway at the rear of the cutter.

7. The combination of means for separating pebbles from roots, sand, etc., connected downwardly-inclined chutes on which said pebbles are discharged, gates slidably mounted adjacent to the connecting portion between said chutes, and a leaf pivoted to swing between said gates.

8. The combination of connected and downwardly-inclined chutes having screens therein arranged above their respective bottoms, a downwardly-inclined screen discharging on said screens at the connecting portion of said chute, and means for closing either of said chutes at the opposite sides of the screen.

9. The combination of connected downwardly-inclined chutes having screens arranged above the bottoms thereof, a downwardly-inclined screen discharging on said screens at the connecting portion of the chute, and means for changing the flow from the last mentioned screen from one of the first mentioned screens to the other.

In testimony whereof I have signed my name to this specification in the presence of two subscribing witnesses.

THOMAS ROBERTS.

Witnesses:
L. G. HENSLEE,
S. L. ROBERTS.